INVENTOR.
ABRAHAM EDELMAN

United States Patent Office 3,555,533
Patented Jan. 12, 1971

3,555,533
FAIL-SAFE PROXIMITY MEASURING SYSTEM
Abraham Edelman, 3524 Hull Ave.,
New York, N.Y.
Filed May 16, 1967, Ser. No. 638,814
Int. Cl. G08b 21/00
U.S. Cl. 340—244        4 Claims

ABSTRACT OF THE DISCLOSURE

The following disclosure describes a proximity sensing system employing a capacitive probe unit connected in a bridge feedback circuit of an amplifier, so that unbalances of the bridge circuit control the oscillatory condition of the amplifier. The probe unit includes electronic circuits, and is connected by cables to a remote indicating, adjusting and power supply unit.

---

This invention relates to systems for the indication and measurement of the proximity of materials or objects to a detecting device. For example, the invention is particularly adaptable to the determination of the level of bulk material in a storage container or in a pile. It will be apparent from the following disclosure, however, that the novel features of the invention may also be advantageously employed in other applications. As discussed in U.S. Pat. No. 2,774,959 to Edelman and Frank, there are many difficulties involved in sensing the proximity of bulk materials such as agglomerations of crushed rock, coal, soil, sand, grain, slag, mortar, etc. For example, the probe must be sufficiently rugged to withstand shocks and pressure from the material it measures, it must be adequately sealed, and it must not require frequent servicing since it is often located in dangerous or inaccessible locations.

A feature of the present invention is an improved system suitable for the above described use, that is, operated according to "fail-safe" principles. In other words, the system indicates "safe" only if the proximity of the material is safe, and also if the system is in good working order, and not otherwise. Other features of the invention are concerned with the system's remote adjustability, sensitivity, adaptability to different types of proximity indications, its fail-safe nature, its avoidance of effects due to ambient conditions and its safe and easy operation and repair by inexperienced personnel. It is therefore an object of the invention to provide a system having the above described features.

According to the invention, at least one capacitive probe is provided that has a variable capacitance dependent upon the properties of the material surrounding the probe, (e.g., air or a material to be measured). The capacitance to ground of the probe is connected in a bridge circuit included in the feedback circuit of an amplifier, so that the presence of positive polarity of feedback will produce oscillations and be dependent upon the relative capacitances of the probe-to-ground capacitance and a balancing capacitor. The oscillating circuit, the probe capacitance and other components are combined to form a compact sensing unit that is readily adaptable to being located in the proximity of a material to be measured, so that the interconnecting cables to a remote measuring adjusting and power supply unit carry only low direct voltages.

The invention may be more clearly understood by reference to the following specifications and the accompanying drawings, in which.

Figure 1:
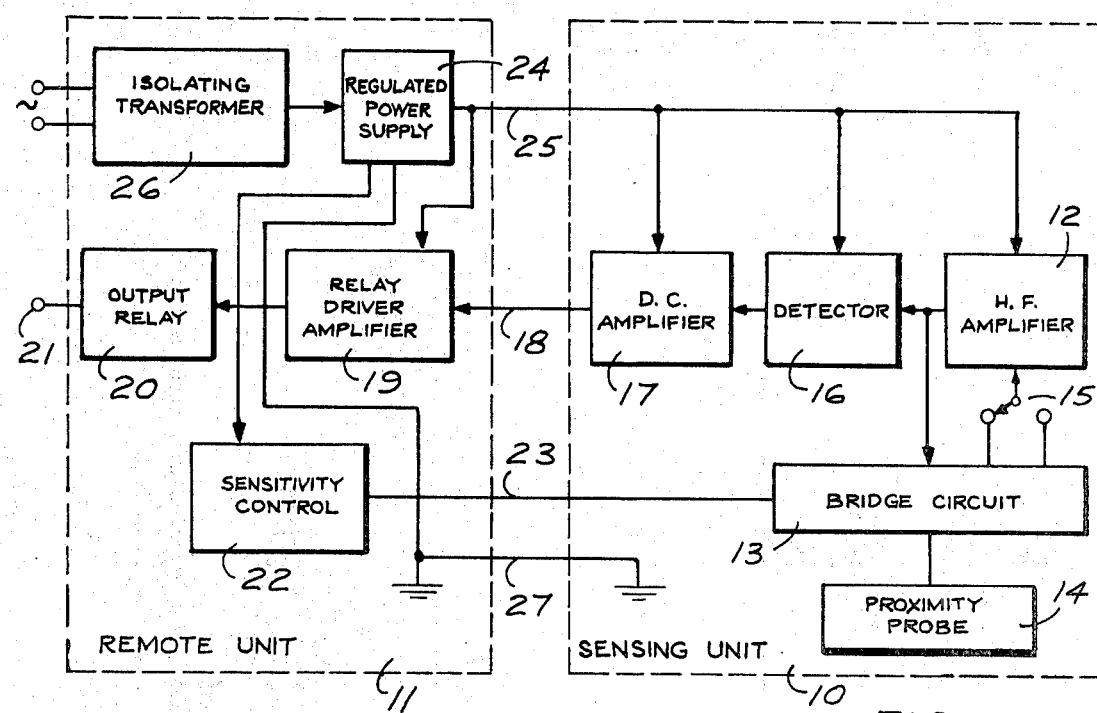
FIG. 1 is a block diagram of a fail-safe proximity measuring system according to the invention.

Referring now to the drawings, and more in particular to FIG. 1, a measuring system according to the invention comprises a sensing unit 10 adapted to be positioned in the vicinity of the material being measured, and a remote unit 11. The sensing unit comprises a high frequency amplifier 12 having its input and output connected to a bridge circuit 13. A proximity probe 14 is connected to the bridge circuit 13. As will be explained in more detail in the following paragraphs, the amplifier 12 and bridge circuit 13 form an oscillator when the capacitance of the proximity probe and unbalances of the bridge circuit act as a positive feedback circuit for the amplifier. The polarity of the feedback may be changed by means of a switch 15 in order to permit changing the mode of operation of the system so that the oscillator maintains oscillations either when the capacitance of the probe is larger or when it is smaller than a reference capacitance.

The sensing unit 10 also includes a detector 16 for rectifying the output of the amplifier 12, and a direct current amplifier 17 for amplifying the output of the detector.

The output of direct current amplifier 17 is applied, by way of a cable 18, to a relay driver amplifier 19 in the remote unit 11. Amplifier 19 energizes an output relay 20 for operating any suitable output circuit (not shown) such as an indicator circuit or control circuit, connected to output terminal 21. The remote unit 11 may also include a sensitivity control 22 connected to the bridge circuit by way of a cable 23, as well as a regulated power supply circuit 24 for providing suitable regulated operating voltages for the sensing and remote units. The sensitivity control 22 may comprise a conventional system for providing a regulated controllably variable voltage. The operating voltages are applied to the sensing unit 10 by way of wires 25, 27 and 18. If desired, the regulated power supply circuit 24 may be energized from an A.C. line by way of an isolating transformer 26. A common ground wire 27 is also provided for the remote and sensing units.

Figure 2:
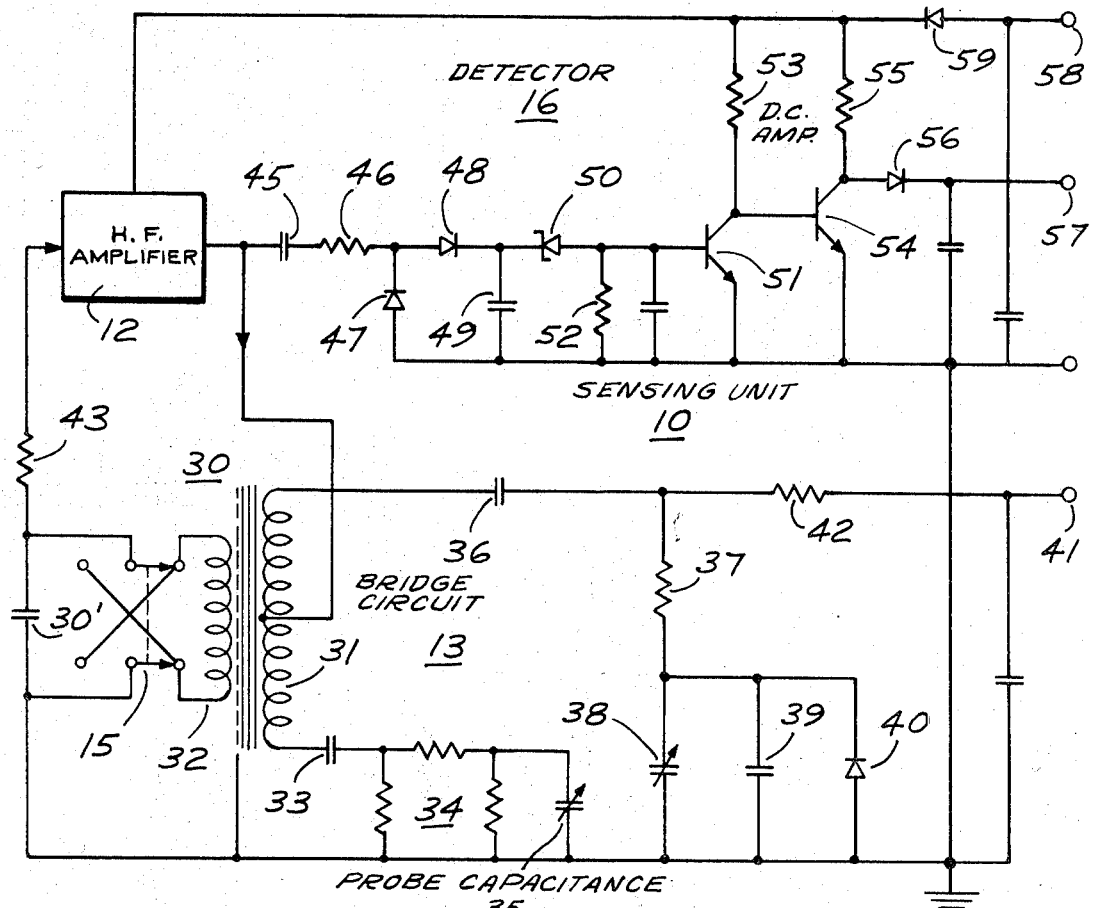
FIG. 2 is a circuit diagram of the sensing unit of the system of FIG. 1.

A more complete diagram of the sensing unit 10 is shown in FIG. 2. In the preferred embodiment of the invention, the bridge circuit 13 comprises a shielded transformer 30 having a center tapped primary winding 31 and a secondary winding 32. A tuning capacitor 30' is connected across secondary winding 32 to provide a tuned output circuit. The tap on the primary winding is connected to the output of the high frequency amplifier 12. The ends of the winding 31 are connected to symmetrical circuits for high frequency currents. For example, the lower end of the winding as shown in FIG. 2 is connected by way of an isolating capacitor 33 and a resistive network 34 to the capacitor 35, which symbolically represents the capacitance of the proximity probe. The upper end of the winding 31 is connected by way of an isolating capacitor 36 and a resistor 37 to the parallel combination of balancing capacitors 38 and 39 and a voltage controlled capacitor varactor diode 40. The other ends of the capacitors 35, 38 and 39 and controlled capacitor diode 40 are connected to ground. The sensitivity-control voltage from the remote unit 11, via wire 23, is applied to terminal 41, and from terminal 41, by way of a resistor 42, to the junction of the capacitor 36 and resistor 37. The sensitivity-control voltage is used to vary the capacitance of diode 40. The capacitance of diode 40 is a function of the D.C. voltage applied across its anode and cathode. The capacitor 36 isolates the D.C.

sensitivity-control voltage from the winding 31, and the capacitor 33 and resistor network 24 are provided to ensure that the circuits connected to the two ends of the winding 31 are symmetrical in the balanced condition. The symmetrical circuit preferably employs components with the same temperature coefficients in both sides of the bridge, so that the circuit retains substantially the same threshhold of oscillation over a wide temperature range.

It should be understood, of course, that the diode 40 may be omitted if it is not desired to have a sensitivity adjustment, in which case the sensitivity depends upon manual adjustment of the balancing capacitor 38. However, the advantages of remotely controlled adjustment are sacrificed.

As seen from the circuit of FIG. 2, when a balanced condition exists between the capacitance of capacitor 35, (the probe capacitance) and the capacitance of capacitors 38 and 39 and diode 40, any currents from the amplifier 12 flow equally in the two halves of the winding 31, and thus no signal appears across the secondary winding 32. In the event of an unbalance, however, currents do flow in the secondary winding, and are fed back, by way of the switch 15 and resistor 43 to the input of the amplifier. The feedback can be either positive or negative, depending upon the direction of the unbalance and the position of the switch 15. When the feedback is positive and above a minimum value, the circuit comprising amplifier 12 and transformer 30 oscillates.

The amplifier 12 is a tuned amplifier having a high gain at only one frequency, for example 475 kc., so that when the feedback is positive the oscillation frequency is determined by the amplifier components. In order to provide stable operation of the system, the amplifier should be designed to be insensitive to voltage fluctuations and ambient temperature changes, and should dissipate a minimum amount of energy so that its components are not subject to internally induced temperature variation.

The output of the amplifier 12 is applied by way of a coupling capacitor 45 to the detector 16 which comprises a series resistor 46, a shunt diode 47, a series diode 48 and a filter capacitor 49. The diodes are poled in the circuit of FIG. 2 to produce a positive voltage across the capacitor 49 when amplifier 12 is in an oscillatory condition.

When the voltage across capacitor 49 is above a predetermined minimum value, it is applied by way of a Zener diode 50 to D.C. amplifier 17 comprising transistors 51 and 54. In particular, the voltage is applied to the base of grounded-emitter transistor 51. The base of the transistor 51 is connected to ground by way of resistor 52, so that the transistor conducts only when a positive potential is applied to its base by way of diode 50. The voltage developed across the collector load resistor 53 of transistor 51 is applied to the base of a second grounded-emitter transistor 54. The voltage developed across the collector resistor 55 of the transistor 54 is applied by way of a protective diode 56 to output terminal 57 for connection to wire 18 of FIG. 1. The direct operating voltage for the circuit is connected to terminal 58, and thence by way of a protective diode 59 to the remainder of the circuit. The diodes 58 and 59 ensure that errors in connection of the cables between the sensing unit 10 and remote unit 11 do not damage the equipment. While the transistors 51 and 54 are shown in FIG. 2 to be NPN transistors, it will be understood that with suitable circuit modifications they may be PNP transistors, and also that other forms of detectors and D.C. amplifier circuits may be employed.

Figure 3:
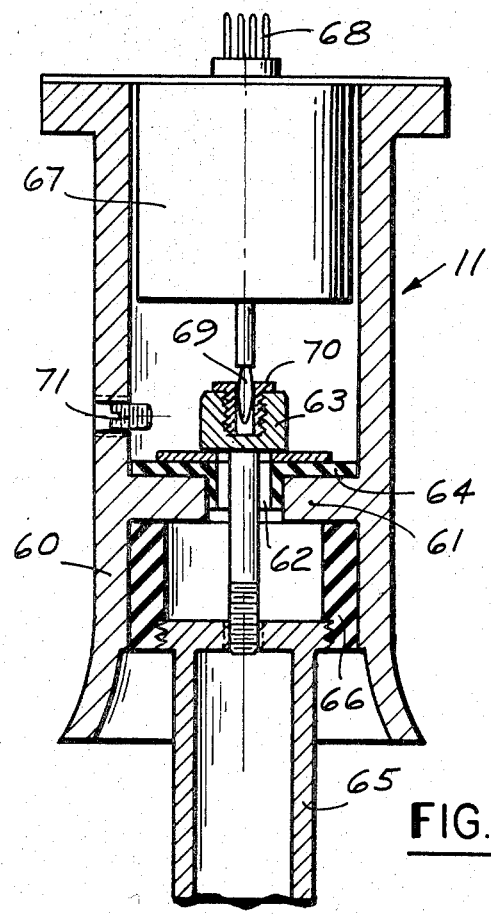
FIG. 3 is a partially cross-sectional view of the sensing unit of FIG. 2.

A partially cross-sectional view of a physical embodiment of the sensing unit 11 according to the invention is illustrated in FIG. 3. The unit comprises a hollow conductive enclosure 60 which forms the grounded electrode of the probe (i.e., of capacitor 35). The enclosure is provided with a central inwardly extending portion 61 with a central aperture 62. A bolt 63 is positioned in the aperture 62 with its head insulated from the inwardly extending portion by an insulating washer 64. A probe tip 65, which forms the ungrounded end of the probe, and may have any desired length, is threaded on the other end of the bolt 63, and extends from one of the enclosure 60, so that a material being sensed may partly fill the region between the probe tip 65 and the enclosure to effect a change in capacitance of the probe. This end of the enclosure is sealed by an annular insulating member 66 between the enclosure and the tip. The electronic circuits of the proximity unit are enclosed in a unit 67 and held in the other end of the enclosure 60 by any suitable means. The unit 67 has a cable connector 68 extending from the enclosure, and a plug-in connection 69 that is positioned to be inserted in a socket 70 threaded in a central aperture in the head of the bolt 63. The initial capacitance of the proximity probe may be adjusted by means of a screw 71 threaded in the wall of the enclosure and having its end extending toward the head of the bolt 63.

Figure 4:
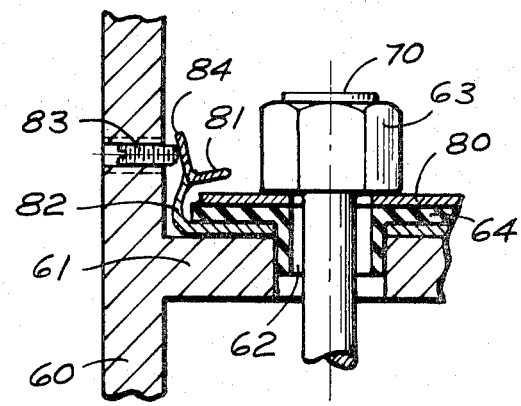
FIG. 4 is a cross-sectional view of a modified portion of the unit of FIG. 3.

In a variation of the capacitance adjustment of the probe, as shown in FIG. 4, a metal washer 80 is positioned between the insulated washer 64 and the head of the bolt 63. A capacitor plate 81 is held in a spaced position with respect to the washer 80 by means of a support 82 between the washer 64 and the portion 61. The plate 81 is held resiliently, so that its position may be varied by means of an adjusting screw 83 extending through the wall of the enclosure and pressing against a bent extension 84 of the plate 81.

Figure 5:
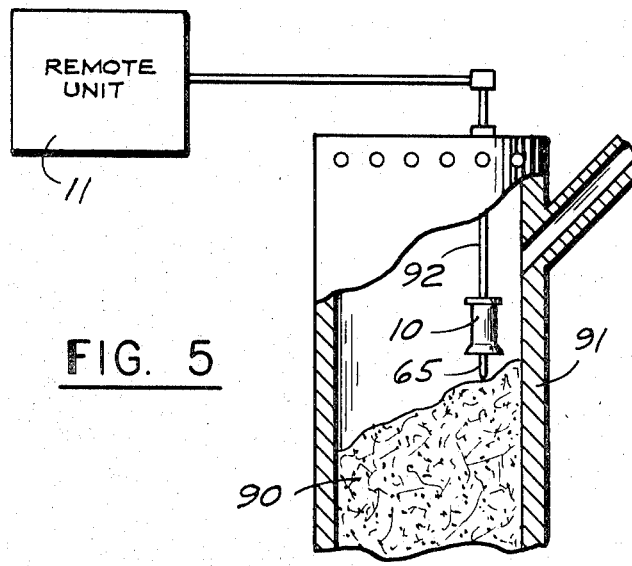
FIG. 5 is a diagrammatic illustration of the use of the system of the invention for measuring the level of material in a bin.

In a typical application of the system of the invention, as illustrated in FIG. 5, the system may be employed for measuring the level of a material 90 in a bin 91 of conventional design. The sensing unit 10 with its extending probe tip 65 is held at a desired level in the bin by any suitable means, such as a vertically extending pipe 92. The cables from the sensing unit 10 may extend through the pipe 92, and are connected externally of the bin to the remote unit 11.

The system as shown in FIG. 5 may be employed either to give an alarm in the event the level of material in the bin is too high, or in the event the level of material in the bin is too low. When used as a high level indicator, the switch 15 is adjusted so that positive feedback is obtained when the probe capacitance is low. In this case, when air surrounds the probe, its capacitance is low, and the bridge is unbalanced to provide positive feedback. When the level of the material rises so that it surrounds the probe, the increase in dielectric constant of the space between the probe tip and enclosure results in a change of the bridge to produce balance or negative feedback, so the circuit stops oscillating.

For "fail-safe" high-level alarm service the relay 20 is connected so that it is energized when the circuit is oscillating and so that an increase in level of material in the bin to the level of the sensing unit effects the deenergization of the relay. With this type of connection of the relay, the system employs the "fail-safe" principle, since an alarm indication will be given due to excess level of material in the bin, as well as due to almost any failure in the circuit. Thus, the relay will be energized to show a safe condition only if the relay coil is not burned out, the electric supply is turned on and functioning, the relay driver circuit, D.C. amplifier and detector are functioning, the circuit is oscillating, the interconnecting wires are in good condition, etc. Consequently, the relay will be deenergized if the level of the material rises too high, or there is a fault in the system. When the system is employed as a high level detector, the oscillator cannot resume oscillation until the level of the material is sufficiently low that the positive feedback state is reached.

Similarly, in the use of the system as a fail-safe low level alarm, the relay is continuously energized, and the oscillator oscillates, unless the level of the material is too low. In this case, the switch 15 is set so that positive feedback is provided when the sensing unit is surrounded by the material, and when the capacitance of the sensing unit falls as a result of too low a level of material, the bridge becomes balanced or provides negative feedback so the oscillations stop.

In the system of the invention, as above stated, erroneous interconnections of the cables to the sensing unit will not damage the system. The cables carry only low voltages, so there is no high voltage hazard, and the interconnecting cables are isolated from the A.C. line. The sensing unit can be repaired by inexperienced personnel, since the replacement of the electronic unit 67 requires no adjustment. The capacitance adjustment of the metal enclosure and sensing tip can be factory set so that all have the same capacitance, and, consequently, a prebalanced electronic unit can be employed in any enclosure without adjustment.

I claim:

1. A system for indicating proximity of an object to a detecting device comprising a sensing unit adapted to be located in the proximity of said object, a remote unit, and means for interconnecting said remote unit and said sensing unit, said sensing unit comprising a grounded housing of conductive material, a probe tip of conductive material extending from said housing and insulated therefrom, said housing and said probe tip cooperating to provide a capacitance sensing probe whereby the dielectric constant of materials between said probe tip and ground determine the capacitance of said capacitance sensing probe, and applied D.C. voltage sensitive capacitor means in said housing, an alternating-current signal amplifier in said housing, said alternating-current signal amplifier having an input terminal and an output terminal, a feedback means in said housing connecting the input terminal to the output terminal of said alternating-current signal amplifier, said feedback means comprising a circuit including at least said capacitance sensing probe and said applied D.C. voltage sensitive means, said feedback means providing a positive feedback from said output terminal to said input terminal of said alternating-current signal amplifier only if the capacitance of said applied D.C. voltage sensitive capacitor means is greater than a limiting capacitance, rectifier means in said housing, said rectifier means including an input terminal connected to the output terminal of said alternating-current signal amplifier and an output terminal for transmitting D.C. signals, a source of a controllably adjustable D.C. control voltage in said remote unit, means including said interconnecting means for connecting said source of a controllably adjustable D.C. control voltage in said remote unit to said applied D.C. voltage sensitive capacitor means whereby adjustments in the D.C. control voltage change the capacitance of said applied D.C. voltage sensitive capacitor means, receiver means for receiving a D.C. signal in said remote unit, and means including said interconnecting means for connecting said receiver means to the output terminal of rectifier means whereby said receiver means receives D.C. signals related to the proximity of an object to said capacitive sensing probe.

2. The system of claim 1 wherein said feedback means includes means for selectively reversing the polarity of the feedback to said alternating-current signal amplifier.

3. The system of claim 1 wherein said feedback means comprises a transformer having a center-tapped primary winding and a secondary winding, means for connecting said secondary winding to the input terminal of said alternating-current signal amplifier, said applied D.C. voltage sensitive capacitor means connected to one arm of said primary winding, and means for connecting said capacitance sensing probe to the other arm of said primary winding.

4. The system of claim 1 wherein said indicating means comprises a relay connected to the output terminal of said rectifier means, said relay being energized only when said alternating-current signal amplifier transmits a signal, the deenergized state of said relay indicating proximity between the material and the detecting device so that whenever said relay is deenergized for any reason in the system said proximity or a system malfunction is indicated whereby the system is fail-safe.

References Cited

UNITED STATES PATENTS

| | | | |
|---|---|---|---|
| 2,774,959 | 12/1956 | Edelman et al. | 340—244(C) |
| 2,908,980 | 10/1959 | Arlin | 317—249X |
| 3,042,908 | 7/1962 | Pearson | 340—244(C) |
| 3,103,002 | 9/1963 | Pearson | 340—244(C) |
| 2,956,234 | 10/1960 | Olsen | 331—138UX |
| 2,999,230 | 9/1961 | Laakmann | 340—244 |
| 3,119,079 | 1/1964 | Keizer | 331—36CX |
| 3,262,326 | 7/1966 | Schott | 331—117X |
| 3,353,126 | 11/1967 | Schucht | 331—117X |
| 3,392,349 | 7/1968 | Bartley | 331—117X |

ALVIN H. WARING, Primary Examiner

D. MYER, Assistant Examiner

U.S. Cl. X.R.

73—304; 331—65; 340—246